United States Patent

Dückinghaus et al.

[11] Patent Number: 5,901,535
[45] Date of Patent: May 11, 1999

[54] FEED CONTROL DEVICE FOR A HARVESTING MACHINE METHOD OF CONTROLLING

[75] Inventors: Heinrich Dückinghaus, Bielefeld; Günther Eis, Harsewinkel; Manfred Pollklas, Rheda-Wiedenbrück, all of Germany

[73] Assignee: CLAAS KGaA, Harsewinkel, Germany

[21] Appl. No.: 08/912,555

[22] Filed: Aug. 18, 1997

[30] Foreign Application Priority Data

Aug. 16, 1996 [DE] Germany ............................ 196 32 977

[51] Int. Cl.⁶ .................................................... A01D 75/00
[52] U.S. Cl. ................ 56/10.2 G; 241/35; 241/101.763; 144/242.1; 144/246.1; 460/1
[58] Field of Search ............................ 56/10.2 G, 10.2 R, 56/10.2 H, 10.2 J; 460/1; 241/34, 35, 101.763; 144/242.1, 246.1

[56] References Cited

U.S. PATENT DOCUMENTS

| 4,261,161 | 4/1981 | Colgrove et al. . |
| 4,332,127 | 6/1982 | Staiert et al. . |
| 4,496,105 | 1/1985 | Fleming et al. . |
| 4,967,544 | 11/1990 | Siegler et al. . |
| 5,795,221 | 8/1998 | Diekhans . |

FOREIGN PATENT DOCUMENTS

| 0014234 | 11/1979 | European Pat. Off. . |
| 0 242 463 | 10/1987 | European Pat. Off. . |
| 2219651A1 | 12/1983 | German Dem. Rep. . |
| 28 19 200 | 11/1978 | Germany . |
| 3505887A1 | 9/1985 | Germany . |
| 3702192A1 | 8/1988 | Germany . |

*Primary Examiner*—Heather Shackelford
*Attorney, Agent, or Firm*—Michael J. Striker

[57] ABSTRACT

The harvesting machine includes an attachment, a feed device for material to be harvested, a cutting drum for the material to be harvested, an ejection means for conveying the material from the cutting drum, an advantageously hydrostatic drive for the feed device, a drive for the cutting drum, respective rotation speed sensors for measuring actual rotation speeds of the cutting drum and the feed device and an electronic analysis unit. To guarantee a constant cutting length of the harvested material or crop, the actual rotation speeds of the feed device and cutting drum are measured, an actual rotation speed ratio of the actual measured rotation speeds of the feed device and the cutting drum is computed in the electronic data analysis unit, a difference between a set rotation speed ratio characteristic of the cutting length and the actual rotation speed ratio is computed in the electronic analysis unit and the analysis unit generates a control signal according to this difference for controlling the hydrostatic drive of the feed device. Furthermore a process of monitoring and controlling the feed of material to be harvested into the harvesting machine is described.

19 Claims, 4 Drawing Sheets

FEED CONTROL DEVICE FOR A HARVESTING MACHINE METHOD OF CONTROLLING

BACKGROUND OF THE INVENTION

The present invention relates to a harvesting machine or field chopper comprising an attachment, an input feed device, a cutting drum, an ejection device and associated drives whereby the input feed device is driven hydrostatically and the cutting drum is driven mechanically. Foreign body detection devices and conditioning devices can also be provided in the path of harvested or chopped up materials. This type of machine is used in farming and is either self-propelled or a pulled by a towing vehicle.

The feed device in harvesting machines or harvesting machines of this type is drive in a known way by chains or by propeller shafts. The cutting length of the harvested materials is adjusted by changing the gear or transmission ratio in the drive train of the feed device in order to change the cutting length in a desirable manner by changing the feed speed while maintaining a constant chopper drum rotation speed. German Patent Application DE-OS 28 19 200 discloses a hydrostatic drive for the feed device of a harvesting machine instead of a mechanical drive unit. Because of this hydrostatic drive the harvesting machine has the additional advantages of reduced structural width, reduced wear of the drive components, a continuous control of the cut or chop length and an easy reversibility For example, German Patent DE 35 05 887 discloses that methods are known for controlling the forward speed of the harvesting machine according to the machine load. In this patent however measures or features are not taken based on a consideration that the cutting length of the harvested materials is increased because of overloading by an excessive forward speed with a measured rotation speed drop of the cutting drum, which has a negative effect on the quality of the harvested crops or materials. In the disclosed system the cutting proceeds with an increased cutting length until the speed is adjusted so that the chopper drum again reaches its set or desired rotation speed. Considerable differences in the yield per unit area of the harvested materials occurring because of differences in the ground fertility, ground water content, shade provided by trees in and beside the field, fertilization differences, weed density or soil density can require a continuous regulation of the forward speed of the harvesting machine during its forward motion, in which the described variations of the cutting length occur during the control process. However without differences in the harvested quantities a one-time preset cutting length cannot always be maintained in a hydraulic system, because the power of the hydraulic drive changes because of different oil leakage amounts caused by pressure differences. The cutting length of the harvested materials can be maintained a constant only by changing the forward speed of the harvesting machine.

SUMMARY OF THE INVENTION

It is an object of the present invention to develop an apparatus and method for controlling feed of materials to be harvested by a harvesting machine, which maintains a preset cutting length as constant as possible, even with differences in hydraulic pressures or amounts of harvested materials.

These objects, and others which will be made more apparent hereinafter, are attained in a harvesting machine, in which the actual rotation speed of the feed device and the cutting drum is measured by rotation speed sensors, transmitted to an electronic analysis unit which computes an actual rotation speed ratio of the measured values of the rotation speeds of the feed device and the cutting drum, then computes a difference between this actual rotation .speed ratio and a set value of the rotation speed ratio and generates a control signal for controlling the hydrostatic drive of the feed device according to this difference so that the difference is subsequently reduced. If the rotation speeds of the feed device and the cutting drum change so that the measured actual value of the rotation speed ratio changes, this ratio difference is detected by the sensors and the analysis unit and the analysis unit can rapidly control the hydrostatic drive to change the rotation speed ratio back to its set value. Because of the high pulse generation rate of the sensors and the analysis electronics, which can take a number of measurements and analyses per second and because of the small mass of the actuators which move in response to the control signal, the rotation speed ratio can even be readjusted in a fraction of a second, so that hardly any changes of the cutting length can occur with different hydraulic pressures and harvested material field densities. With the apparatus according to the invention the chosen cutting length can be maintained approximately constant by control of the rotation speed ratio of the feed device and the cutting drum also using a hydrostatic drive. The device for controlling material feed according to the invention can also be used in a harvesting apparatus or machine, in which not only the feed device, but also the cutting drum, or only the cutting drum are hydrostatically driven.

In a preferred embodiment of the invention the analysis unit controls the hydraulic pump of the hydrostatic drive of the feed device or the cutting drum when the drive is hydrostatic It is advantageous when a hydraulic motor is used as the motor for the hydraulic drive and both the hydraulic motor and the hydraulic pump are controllable by a control signal or signals from the electronic analysis unit. The control module of the analysis unit can activate either a "forward" or "reverse" control coil of the hydraulic pump so that the feed device either draws material in or reverses by means of a pulse width control signal generated either automatically or on input of a command via operator-controlled elements. The rotation speed of the hydraulic pump for driving the feed device depends directly on the current flowing through it. By changing the applied voltage then a change in the drive rotation speed of the hydraulic pump can be obtained in a suitable manner. The set rotation speed ratio which is a measure of the cutting length, which the actual rotation speed ratio is compared, is transmitted to the electronic analysis unit by an operator-controlled device. The operator-controlled device advantageously comprises a rotary potentiometer, and the cutting length is varied by varying its resistance between its maximum and minimum resistance values.

In order to obtain a greater variation of the cutting lengths, it is known to reduce the number of cutting elements mounted on the cutting drum In order to provide an accurate cutting length in a harvesting machine in which the number of cutting elements has been reduced, the analysis electronics is provided with a sensors which are mounted on the cutting drum and detect the number of cutting elements. When the rotation speed of the cutting drum is different, the rotation speed sensor of the cutting drum detects the changed rotation speed value, to which the associated rotation speed of the feed device must be correspondingly changed in order to be able to set and maintain a predetermined cutting length.

Deviations of the actual rotation speed ratio of the feed device to the cutting drum from its set value are automatically and/or manually adjustable in a short time with the device according to the invention This is advantageous in order to handle the crop or material yield at especially high harvested material density by increasing the cutting length without decreasing the rotation speed of the motor and reducing the forward motion speed, to prevent a destruction of the motor or to shorten the cutting length with especially brittle material to be harvested in a short time. A suitable manual control can occur by activation of a switch or key in the driver's cabin or automatically by suitable software. A rotation speed drop exceeding a predetermined tolerance or threshold value detected by the electronic analysis unit is evaluated as an overload parameter or value by the electronic analysis unit and transmitted to other electronic devices including operator devices, warning devices and memory units. The electronic analysis unit automatically increases the drive power of the feed device when the overload value is generated by transmitting a control signal to the hydrostatic drive in order to counteract an increasing danger of clogging the feed device which increases during a drop in rotation speed. The feed control means in the electronic analysis device is integrated in one or more electronic modules, which exchange signals with other modules by means of a CAN bus. The electronic analysis unit can display preselected cutting lengths, rotation speeds or other measured work parameters on display devices, such as display screens, display units and/or clock devices in the driver's cabin or at other places in the harvesting machine, inform the driver by control lights and/or acoustic signals regarding critical vehicle conditions and/or warnings and/or inform the driver regarding actual work status of the feed device, for example, feeding, reversing, etc, by means of display devices, such as display screens, displays, control lights and the like.

In some additional embodiments the attachment can be driven by hydrostatic drive of the feed device. This embodiment has the advantage that the drive power of the attachment device is changed at the same time as the drive of the feed device during adjustment of the hydrostatic drive of the feed device, so that clogging of the feed device by too much material from the attachment is avoided as much as possible.

In a preferred embodiment of the invention a foreign body detection device can be connected to the electronic analysis unit. When it receives a signal from the foreign body detection device indicating that a foreign body is present, it activates a drive lock in the feed device which halts the feed device. Also the electronic analysis unit can switch on a locking mode, which only permits a reverse prior to the feeding of fresh harvested material. The lock mode can provide a stored operating sequence for the reverse, for example a turn on of the reverse of the feed device and the attachment, the raising of the holder for the attachment predetermined time stages for the reverse and subsequent lowering of the holder for the attachment and a slower control feed for observation of whether there are still foreign bodies in the harvested material or in the vicinity of the feed device.

The electronic analysis device can store one or more operating states or signals from the components connected to it or controlled by it. This can be significant for example for maintenance purposes when the maintenance personnel have information regarding the frequency and extent of the differences between the actual rotation speed ratio between the feed device and the cutting drum and its set value, because this leads to conclusions regarding errors or faults in the hydraulics and their load, or when signals are stored from the foreign body detection device, also to be able to control the timing and switching of operations for restarting the harvesting machine, indicating whether the drive has in fact removed the foreign object.

The control module in the electronic analysis unit should be provided with many or several output lines in preferred embodiments of the apparatus of the invention The electronic analysis unit can control magnetic valves, displacement magnets and electric switches via the output lines or the hydrostatic pumps and motors by pulse width output signals transmitted over the output lines.

The invention also includes a process for control of the feed device of the harvesting machine whose characteristic features are apparent from the above description and the appended claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
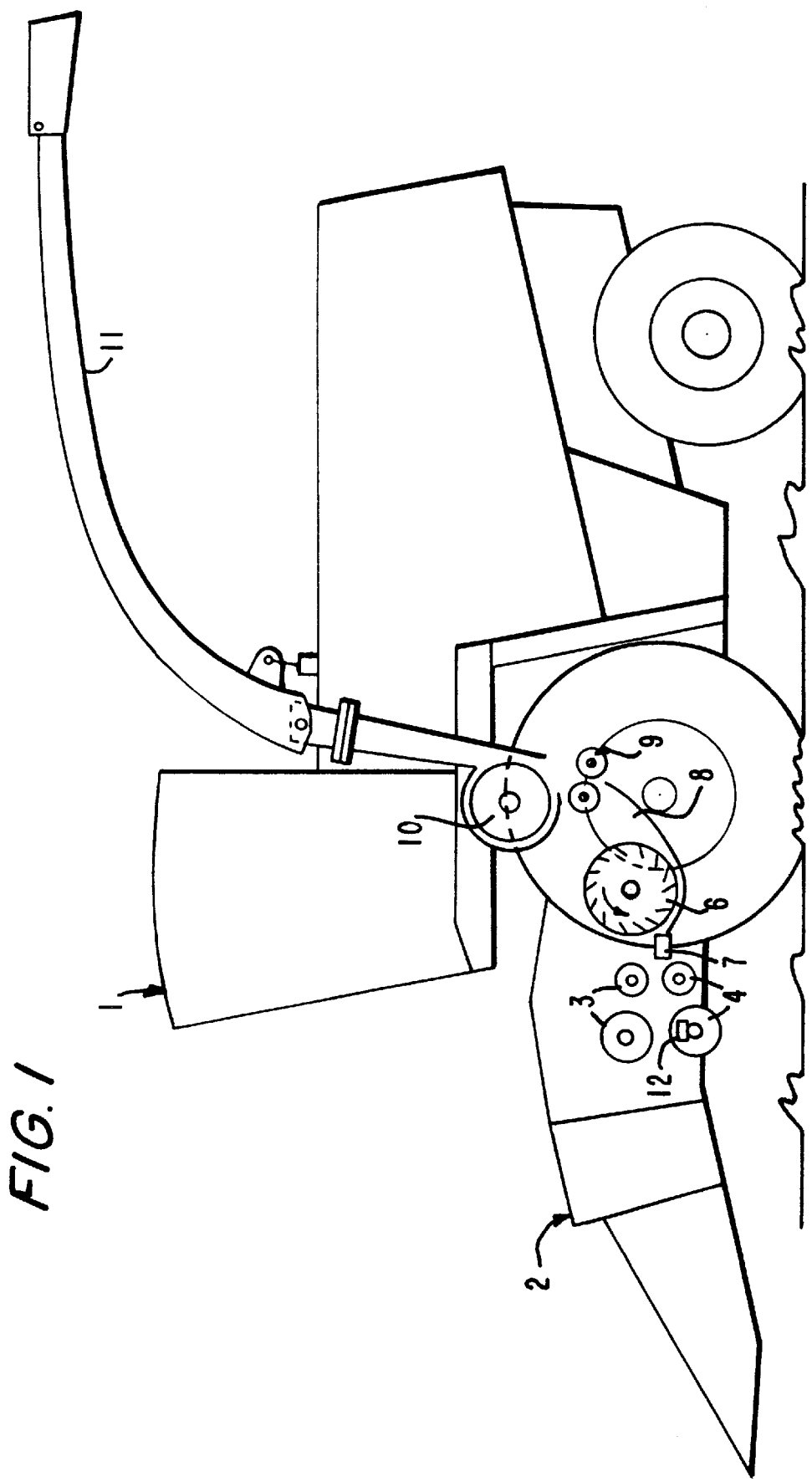
FIG. 1 is a schematic side view of a harvesting machine according to the inventions.

A self-propelled harvesting machine or field chopper 1 as shown in FIG. 1 has an attachment 2. The attachment 2 illustrated in FIG. 1 is a corn picker, but it could also be any of a variety of attachments for the harvesting machine, for example a Pickup or Salix harvesting attachment The attachment takes the materials to be harvested from the field and feeds them to a feed device, which comprises a group of rollers including upper rollers 3 and lower rollers 4 in the illustrated embodiment The feed device exerts a pressing force on the harvested materials and feeds them to the cutting drum 5, whose cutting elements 6 cut the harvested material stream supplied by the feed device by a rotary motion. The cut and/or chopped harvested material is accelerated by the rotary motion of the cutting drum into the ejection shaft 8, from where it is processed eventually by a conditioning device 9 according to the structure of the harvesting machine and is fed into an accompanying transport vehicle through an ejection pipe device 11 after further acceleration by a downstream accelerating device 10. A foreign body detection device 12 arranged in a front roller 3 or 4 monitors the harvested material stream for an eventual foreign body and stops the drive of the feed device when a foreign body is detected.

Figure 2:
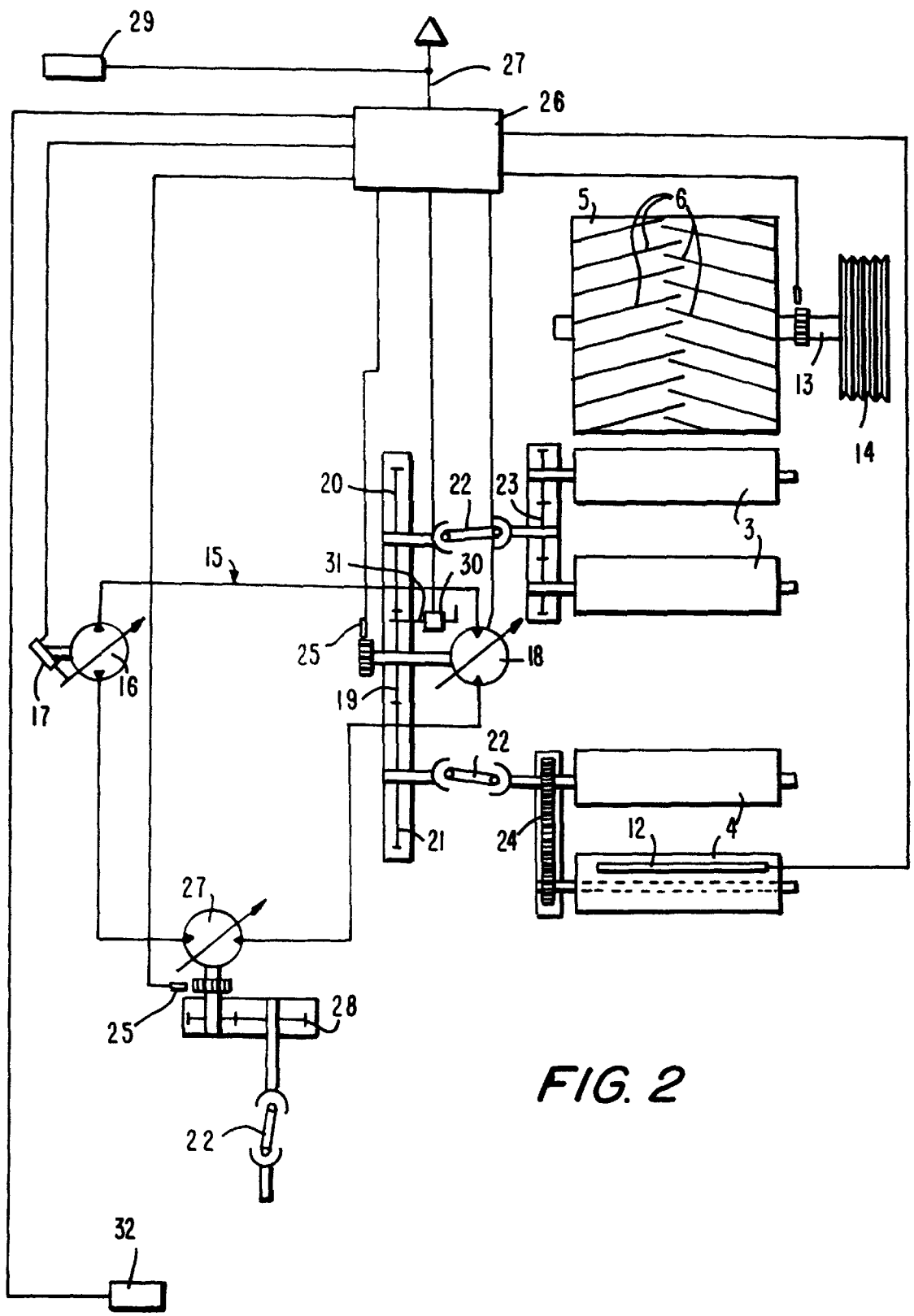
FIG. 2 is a schematic diagram of the drive device for the feed device and cutting drum of the harvesting machine according to FIG. 1.

FIG. 2 shows the feed device with the upper rollers 3 and lower rollers 4 as well as the cutting drum with stylized peripherally attached cutting elements 6 in V-shaped arrangement relative to each other. A belt pulley 14 is rigidly attached to the shaft 13 of the cutting drum 5, to which the drive force produced by the motor for the cutting drum 5 is transmitted by means of a drive belt. The feed device 3, 4 is not driven directly by the motor, but instead by a hydrostatic device 15.

The hydrostatic device 15 includes a hydraulic pump 16 with an associated cylinder 17 and an associated hydraulic motor 18 connected to it with a hydraulic line, which drives the gear 19 which, in turn, drives the meshing toothed gear wheels 20, 21. The additional or further gears 23, 24 can connected with the toothed gear wheels 20, 21 by respective universal-joint shafts 22, which transmit the drive force to the stub shafts of the rollers 3, 4 by means of additional gear devices or a chain drive.

The drive scheme of the invention is in no way limited to the details of the present embodiment, but one skilled in the art could make a variety of changes in it. It is important for the invention however that the feed device 3, 4 and the cutting drum 5 be separated from each other so that the rotation speed of the feed device 3, 4 and the cutting drum 5 can be changed independently of each other. However instead of a hydrostatic or mechanical drive, for example an electrical drive can be provided for one or more of the components 3, 4 and 5.

Rotation speed sensors 25 are mounted at suitable positions, in this embodiment on the shaft 13 of the cutting drum 5 and on the shaft of the gear 19, and their signals are fed to an electronic analysis unit, which is located in a modular component 26. The analysis unit forms an actual rotation speed ratio from the respective actual rotation speed values transmitted from the rotational speed sensors 25 and the actual rotation speed ratio of the feed device 3, 4 to the cutting drum 5 is compared with a set or desired rotation speed ratio resident for a certain harvested material length in the analysis unit. During a deviation of the actual rotation speed ratio from the set rotation speed ratio the analysis unit transmits an adjusting signal for control of the hydrostatic device 15 to the adjusting cylinder 17 of the hydraulic pump 16, which is suitable to reduce the difference between the set and actual rotation speed ratio. This control loop is repeated as often as possible until the difference between the set and actual rotation speed ratios is at least approximately compensated. In order to relieve the electronics and adjusting mechanism from continuous control operation a predetermined limiting value or values can be provided to the electronic analysis unit. The analysis unit is then only activated when a predetermined difference between the actual and set values of the rotation speed ratio is exceeded. A smoothed actual rotation speed value can be obtained by averaging measured values, or by computation from past actual rotation speed values, and in some cases only the obtained smoothed actual rotation speed value is compared with the set rotation speed value. Furthermore measurements may be made and adjusting signals generated only at certain time intervals, for example only every 2 seconds. In practice a combination of one or more of the described or comparable steps can be used. In order to provide a larger variation range, not only the hydraulic pump 16 but also the motor 18 can be formed as an positioning motor. This arrangement still has the advantage that the rotation speed adjustment can occur very quickly. This is then particularly advantageous when a rapid rotation speed change has occurred because of an interruption or an overload. In such a case the hydraulic pump 16 is adjusted to its smallest feed stroke and the motor 18 to its greatest absorption volume. This process can proceed automatically or be activated by input of a command manually by an operator of the electronic analysis unit.

The motor 27 is connected to the hydrostatic device 15, which drives the attachment 2 by means of a transmission device 28 and a universal-joint shaft 22. The actual rotation speed of this drive for the attachment 2 can be monitored here also by means of a rotation speed sensor 25 connected with the electronic analysis unit and can be integrated in the feed control by the analysis unit. Instead of the connection of the motor 27 to the hydrostatic device 15 however it is also possible to provide a separate hydraulic control loop for the attachment 2, whose control however is similarly performed by the an adjusting signal from the electronic analysis unit.

The control module or console 26 is connected by a cable 27 with additional electronic units of the harvesting machine, for example by a CAN bus, and exchanges signals with these additional electronic units. For example signals are exchanged with operation devices, display devices and warning device by means of this cable 27. As an operation device, for example, a rotary potentiometer 29 can be mounted in the driver's compartment, but also at other places in the harvesting machine The electronic analysis unit can obtain the required set rotation speed ratio between the rotation speed of the feed device 3, 4 and the cutting drum 5 from the voltage present at the rotary potentiometer 29. For example a signal range of 5 V, for example, can be available at the rotary potentiometer 29. The maximum voltage value corresponds to the maximum cutting length, e.g. 17 mm, and the lowest voltage value corresponds to the minimum adjustable cutting length, e.g. 4 mm. When a difference is detected between the set and actual values of the rotation speed the analysis electronics can transmit a modulated pulse signal as the adjusting signal to control the adjusting cylinder 17, whereby a change of the actual rotation speed ratio of the feed device 3, 4 and the cutting drum 5 is obtained by adjustment of the positioning motor 16. A foreign body detection apparatus or device 12, which is provided for locating metal or stone, can be connected to the cable 27 or also directly to the control module 26. On receiving a warning signal from the foreign body detection device 12 the analysis electronics activates a connected displaceable magnet 30 which moves a shaft pawl 31, which, because of that, stops the drive of the feed device 3, 4. Simultaneously the analysis electronics can turn on a warning light by means of the cable 27, which signals the driver that a foreign body has been found. Furthermore the analysis electronic can be also switched to a locked mode when it receives a warning signal from the foreign body detection device 12, which allows only one activation of the reversing function, before the feed device can be started once again. The operating sequence stored in the analysis electronics can be retrieved automatically, or by manual input of a command by the driver. The electronic analysis unit 26 can be connected with the additional sensors 32 for monitoring the performance of the stored operating sequence, for example a sensor for monitoring position of the holding down device on the attachment in the form of a rotary potentiometer. An automatic attachment detection can be provided in the analysis unit or in the sensor 32 which permits the analysis unit to make a correct correlation of the signals of the sensor 32 and allows a correct control of the attachment 2. Furthermore the control module 26 has memory elements available to it, in which the analysis electronics can store one or more data regarding received or transmitted signals, operating states of the components controlled by it, etc. The control module 26 is provided with several output lines.

Figure 3:
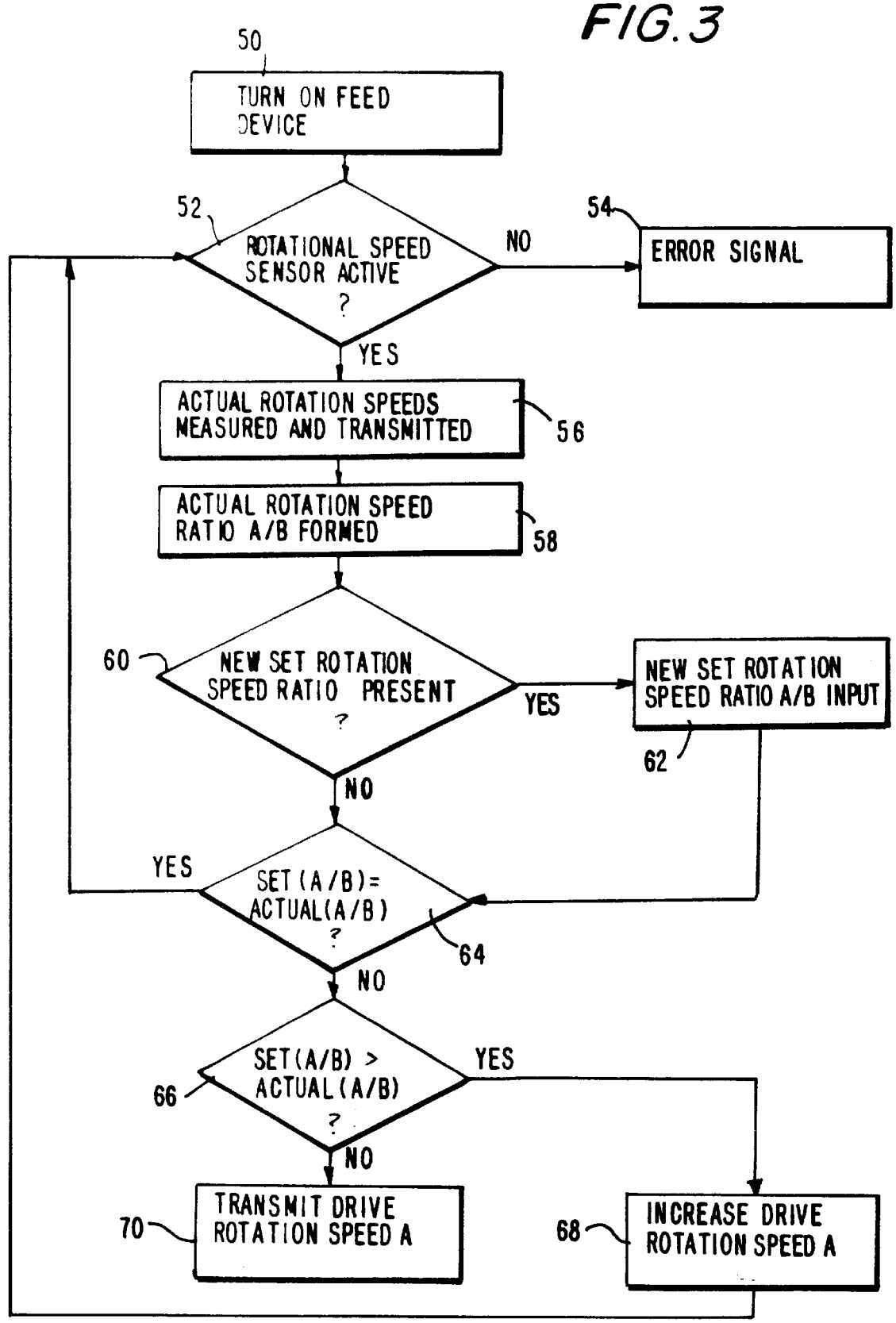
FIG. 3 is a flow chart of an embodiment of the method according to the invention for controlling the feed device of the harvesting machine.

A flow chart for a program or routine suitable for use by a microprocessor acting as an analysis unit for controlling the feed device or the feed to the harvesting machine is shown in FIG. 3. The cutting drum rotates in the standard case with a rotation speed (B)=1,200 rpm in the exemplary embodiment. A rotation speed (A) of the feed device 3, 4 corresponding to a predetermined cutting length x amounts, for example, to 600 rpm. When both of these rotation speed values are used to form the ratio A/B, a rotation speed ratio of 600/1200=0.5 results for the cutting length x. Should the cutting length x be achieved, the rotation speed ratio of 0.5 is simultaneously the set rotation speed ratio. The rotation speed sensors for the feed device measure a rotation speed of 600 rpm and a rotation speed of 1,200 rpm for the cutting drum, so that the actual rotation speed ratio A/B is also 600/1,200=0.5. Thus there is no difference in this case between the set and actual values of the rotation speed ratio. If the rotation speed sensor for the feed device however only measures a rotation speed of 500 rpm, an actual rotation speed ratio of 500/1200=0.416 and thus a difference in the rotation speed ratio of 0.084 results. Because of this positive difference the feed device must be accelerated in order to achieve adjusted cutting length x. If a new cutting length is set by means of the rotary potentiometer 29, which is less than the previous cutting length, the feed speed of the feed device must be reduced with constant cutting drum rotation speed, for example to 300 rpm. The set rotation speed ratio amounts then in this case A/B=300/1200=0.25. In order to reach this set rotation speed ratio and thus the new cutting length x(new), the electronic analysis unit must reduce the rotation speed of the drive for the feed device. This regulating process may be described as a control routine.

Next the rotation speed sensors 25 are tested with feed 50 turned on. If an error is detected, an error signal 54 is generated. If the rotation speed sensors 25 are in order, the actual rotation speeds are measured in step 56 and transmitted to the analysis unit and there the actual rotation speed ratio is determined in step 58. Then whether the previous set rotation speed ratio, or a new set rotation speed ratio because it has changed on account of a change in the voltage value at the rotary potentiometer 29, must be compared with the actual rotation speed ratio is tested in step 60. If a new set rotation speed ratio is present, it is read in or retrieved in step 62. Then in step 64 as with the unchanged set rotation speed ratio, whether or not the set and actual rotation speed ratios are equal, or approximately equal as described above, is tested. In case both values are equal or nearly equal, the hydrostatic drive does not need to be regulated and the rotational speed control can begin again at step 52. If the value are unequal as determined at step 66, the hydrostatic drive must be accelerated at step 68, when the actual rotation speed ratio A/B is greater than the set rotation speed value, and must be decelerated when the actual rotation speed ratio A/B is smaller at step 70. The acceleration or deceleration occurs by means of a PWM power output of the control module 26, which controls the hydropump or hydraulic pump 16 or hydromotor 18 with changed pulse width After than the rotation speed ratio can be tested in a new testing cycle starting at step 52, until the feed to the harvesting machine is shout off.

Figure 4:
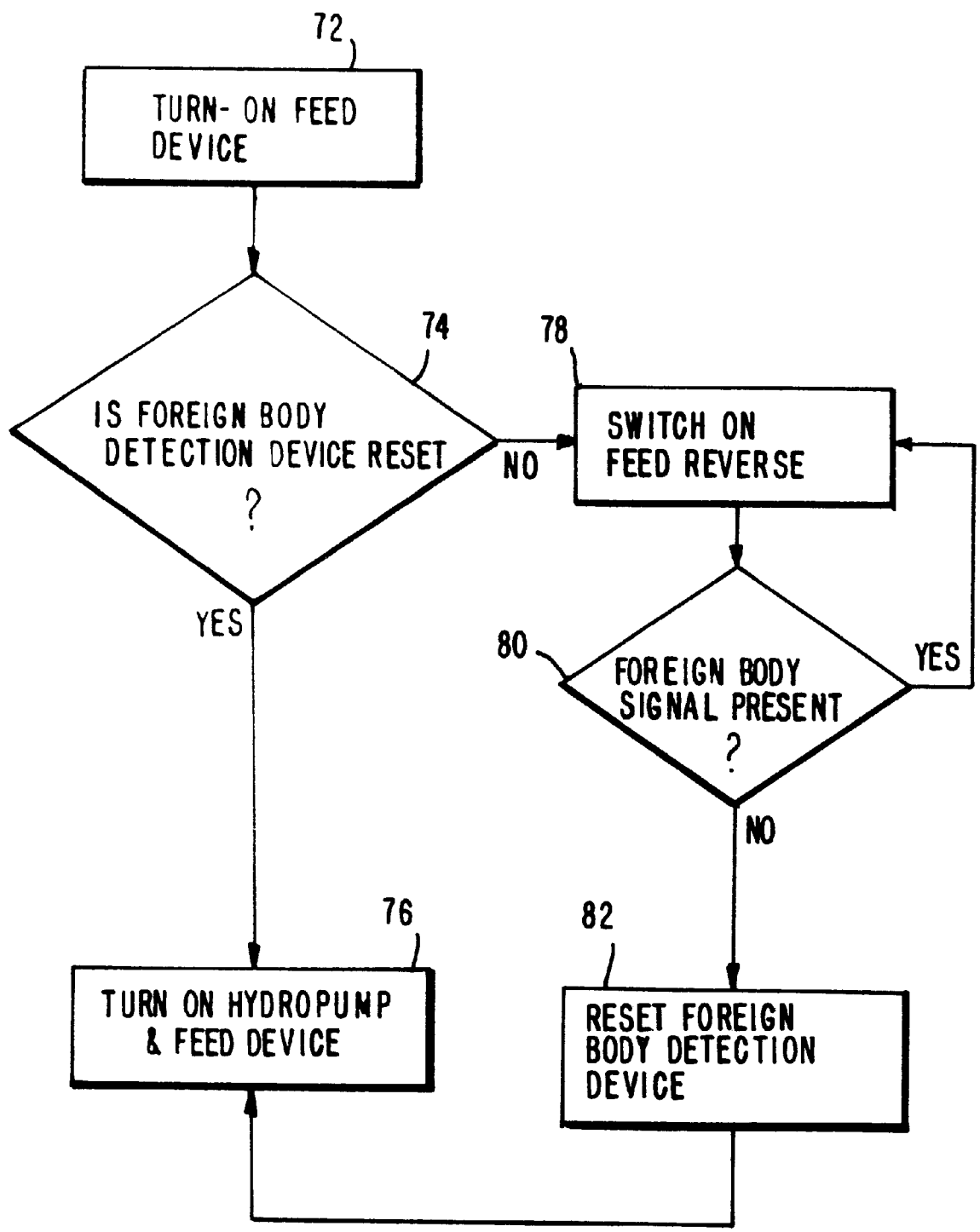
FIG. 4 is a flow chart of a part of a method for controlling the harvesting machine by detecting the presence of foreign bodies in the harvesting machine feed.

In order to be able to reliably guarantee that no foreign body is found within the input or feed range when the feed device is turned on, the control process shown in FIG. 4 should be followed. After turning on the feed device at step 72 whether or not the foreign body detection device is reset or not is tested in step 74. If a reset state is indicated, the hydropump of the feed device can be turned on in step 76. If on the other hand the foreign body detection device is not in the reset state, a manual reverse or automatic reverse must be activated in step 78. In step 80 one tests whether the foreign body indicating signal of the foreign body detecting device is present. If that signal is present, an additional reverse must be activated at step 78; but if there is no foreign body detection signal present, the foreign body detection device can be put into the "reset" state in step 82 so that the feed device can be turned on by turning on the hydropump according to step 76. This described testing mode can be performed at the start of the field chopper or harvesting machine, but also when a foreign body detection signal is produced by the foreign body detection device.

The disclosure in German Patent Application 196 32 977.9 of Aug. 16, 1996 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a feed control device for a harvesting machine or chopper and method of controlling the feed control device of the harvesting machine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A harvesting machine comprising an attachment for collecting material to be harvested, a feed device including at least one rotating element for feeding collected material from the attachment, a rotatable cutting drum for cutting the material, an ejection means for conveying the material from the cutting drum, means for rotatable driving the at least one rotating element of the feed device, means for rotatably driving the cutting drum, respective rotation speed sensors for measuring actual rotation speeds of the rotatable cutting drum and the at least one rotating element of the feed device and an electronic analysis unit connected to the rotation speed sensors to receive rotation speed signals therefrom;

wherein said electronic analysis unit includes means for computing an actual rotation speed ratio of the actual measured rotation speeds of the feed device and the cutting drum, means for storing a set rotation speed ratio of the feed device rotation speed and the cutting drum rotation speed, means for determining a difference between the set rotation speed ratio and the actual rotation speed ratio and means for generating a control signal according to said difference, so that said difference can be at least reduced in accordance with the control signal, which thereby provides a substantially constant length cut of the material.

2. The harvesting machine as defined in claim 1, further comprising one of means for controlling the means for driving the feed device according to said control signal to reduce said difference and means for controlling the means for rotatably driving the cutting drum according to said control signal to reduce said difference, wherein at least one of said means for driving the feed device and said means for rotatably driving the cutting device includes a hydraulic pump.

3. The harvesting machine as defined in claim 2, wherein said means for driving the feed device is hydrostatic and comprises a hydraulic positioning motor as well as the hydraulic pump and means for controlling said means for driving the feed device include means for controlling the hydraulic positioning motor as well as said hydraulic pump according to said control signal to reduce said difference.

4. The harvesting machine as defined in claim 3, wherein said means for controlling said hydraulic positioning motor and said hydraulic pump includes a forward motion activating coil of the hydraulic pump and a reverse motion activating coil of the hydraulic pump, and said electronic analysis unit includes means for generating a pulse width output signal for controlling at least one of said forward motion activating coil and said reverse motion activating coil of the hydraulic pump, automatic means for activating the means for generating the pulse width output signal and a control module including operator-activated elements for input of a command to the electronic analysis unit for activating the means for generating the pulse width output signal.

5. The harvesting machine as defined in claim 1, further comprising means for determining the set rotation speed ratio, which is used to find said difference, from a set or desired cutting length for the material harvested, and wherein said means for determining the set rotation speed ratio includes an operator-controlled device.

6. The harvesting machine as defined in claim 5, wherein the operator-controlled device comprises a rotary potentiometer connected to the electronic analysis unit.

7. The harvesting machine as defined in claim 3, wherein the cutting drum includes a plurality of cutting elements arranged thereon for cutting the material harvested, further comprising a cutting element number sensor connected to the electronic analysis unit, said cutting element number sensor including means for counting the cutting elements arranged on the cutting drum to obtain a counted number and means for generating a cutting element number signal indicative of the counted number of the cutting elements in the electronic analysis unit, and wherein said means for controlling said positioning motor and said hydraulic pump is responsive to said cutting element number signal as well as said control signal.

8. The harvesting machine as defined in claim 1, wherein said actual rotation speed ratio is allowed to deviate from said set rotation speed ratio for a predetermined time interval.

9. The harvesting machine as defined in claim 1, wherein the electronic analysis unit includes means for generating an overload signal when a detected decrease in the actual rotation speed of the feed device exceeds a predetermined threshold value within a predetermined time interval, and further comprising at least one of a display device, warning device and memory device for said overload signal.

10. The harvesting machine as defined in claim 3, wherein the electronic analysis unit includes means for generating an overload signal when a detected decrease in feed device rotation speed exceeds a predetermined threshold value within a predetermined time interval, and said means for controlling said hydraulic pump and said positioning motor includes means for automatically controlling drive power of the feed device according to said overload signal during an overload.

11. The harvesting machine as defined in claim 3, wherein the electronic analysis unit includes at least one electronic module integrated therein for generating signals for control of said hydrostatic means for driving the feed device, and further comprising at least one other module and a CAN bus connecting said at least one electronic module in the electronic analysis unit with the at least one other module for exchange of electronic signals.

12. The harvesting machine as defined in claim 1, wherein the electronic analysis unit includes means for determining a plurality of operating parameters including cutting length and rotation speeds and means for transmitting values of said operating parameters determined by said means for determining the operating parameters to an operator of the harvesting machine, said means for transmitting said values including at least one of display screens control lights acoustic signaling devices and clocks to inform the operator of critical operating conditions and actual work status.

13. The harvesting machine as defined in claim 3, wherein said hydrostatic means for driving the feed device includes means for driving the attachment.

14. The harvesting machine as defined in claim 1, further comprising a foreign body detection means for generating a foreign body detection signal when the foreign body detection means detects a foreign body, and wherein said foreign body detection means is connected to said electronic analysis unit and transmits said foreign body detection signal to said electronic analysis unit when said foreign body is detected.

15. The harvesting machine as defined in claim 14, wherein said feed device has a drive lock device connected with said electronic analysis device and said electronic analysis device includes means for activating said drive lock device to halt said feed device when said electronic analysis device receives said foreign body detection signal.

16. The harvesting machine as defined in claim 1, wherein the electronic analysis unit includes means for storing signals from or operating state parameters of at least one additional electronic component connected therewith.

17. The harvesting machine as defined in claim 4, wherein the control module has a plurality of output lines.

18. A method of controlling feed of material to be harvested to a harvesting machine, said harvesting machine comprising an attachment for collecting the material to be harvested, a feed device including at least one rotating element for feeding collected material from the attachment, a rotatable cutting drum for the material, an ejection means for conveying the material away from the cutting drum, hydrostatic means for rotatably driving the at least one rotating element of the feed device hydrostatically and drum drive means for rotatably driving the at least one rotating element of the cutting drum, said method comprising the steps of:

a) measuring respective actual rotation speeds of the at least one rotating element of the feed device and of the cutting drum by associated rotation speed sensors and transmitting signals indicative of measured values of the actual rotation speeds measured by the rotation speed sensors to an electronic analysis unit;

b) computing an actual rotation speed ratio of said measured values of the respective actual rotation speeds of the feed device and the cutting drum in the electronic analysis unit;

c) comparing a set rotation speed ratio with the actual rotation speed ratio computed in step b) in the electronic analysis unit;

d) computing a difference between the set rotation speed ratio and the actual rotation speed ratio in the electronic analysis unit; and e) generating a control signal for control of the hydrostatic means for driving the feed device in the electronic analysis unit according to said difference, so that said difference can be at least reduced in accordance with the control signal, which thereby provides a substantially constant length cut of the material.

19. The method as defined in claim 18, said harvesting machine further comprising means for reversing the feed device and a foreign body detecting means for generating a foreign body detection signal indicating the presence of a foreign body in the feed device, said method further comprising the steps of:

f) first reversing the feed device via the means for reversing when said means for rotatably driving of said feed device is turned on;

g) testing for presence of the foreign body detection signal indicating the presence of the foreign body in the feed device;

h) continuing to run the feed device in reverse if said foreign body detection signal is found to be present in step g); and i) then repeating steps g) and h) until said foreign body detection signal is no longer present; and j) after step i), running the feed device forward as long as the foreign body detection signal is not present again.

* * * * *